A. HULSMANN.
CONTRA-PISTON BRAKE FOR MOTOR VEHICLES.
APPLICATION FILED SEPT. 24, 1921.
1,411,887.
Patented Apr. 4, 1922.
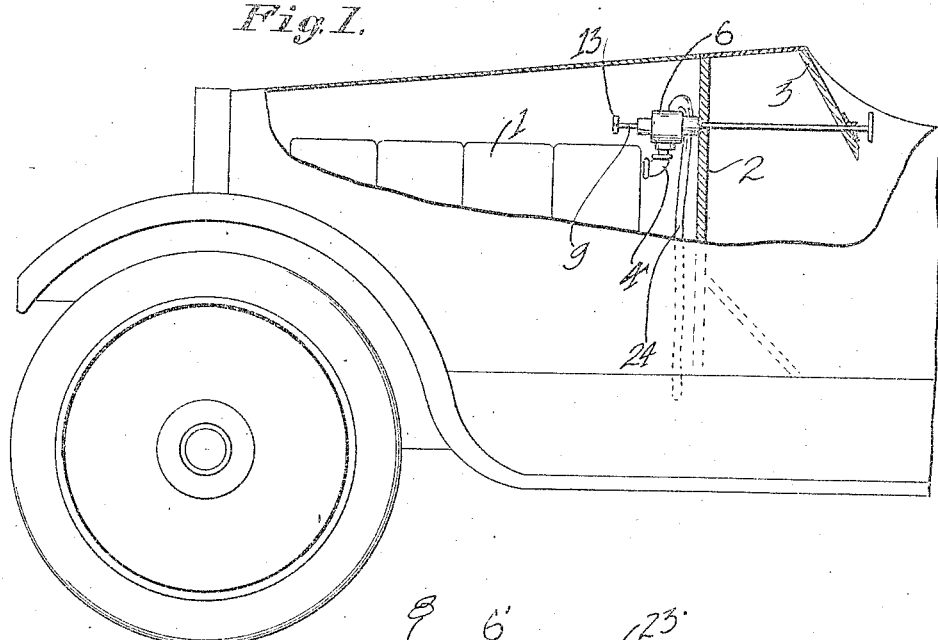
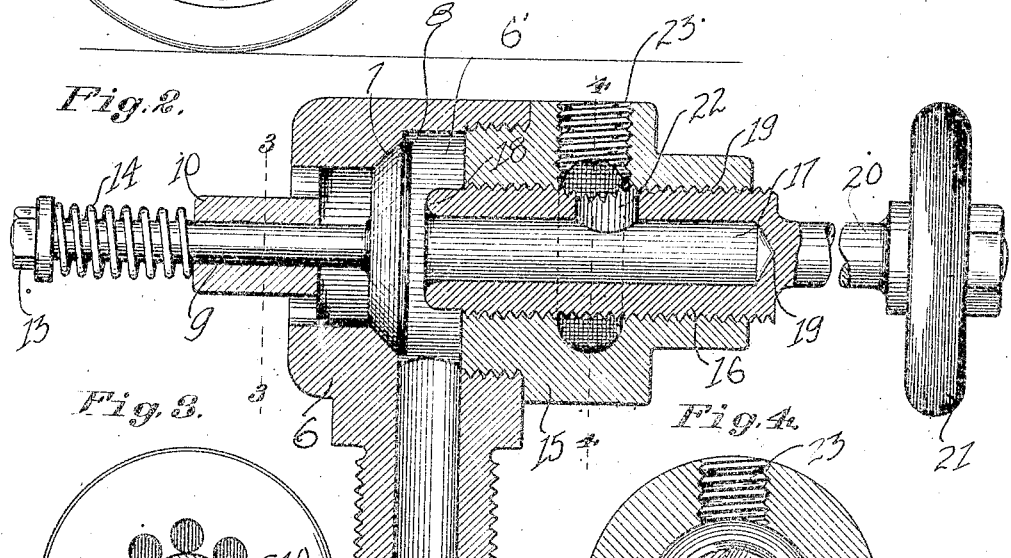
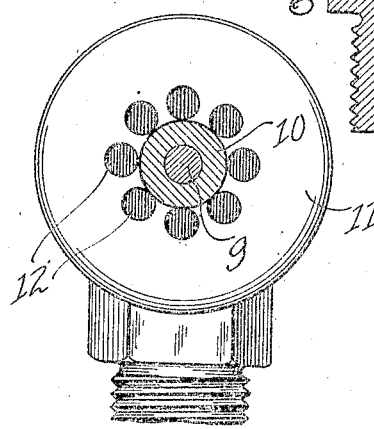
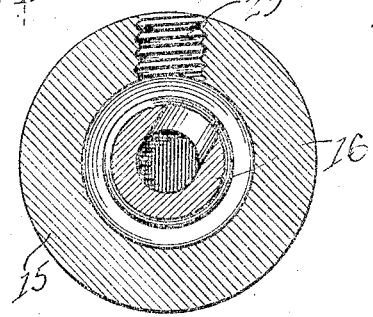
Inventor
Anton Hulsmann
By Victor J. Evans
Attorney

UNITED STATES PATENT OFFICE.

ANTON HULSMANN, OF SAN FRANCISCO, CALIFORNIA.

CONTRA-PISTON BRAKE FOR MOTOR VEHICLES.

1,411,887.  Specification of Letters Patent.  Patented Apr. 4, 1922.

Application filed September 24, 1921. Serial No. 502,912.

*To all whom it may concern:*

Be it known that I, ANTON HULSMANN, a citizen of Germany, residing at San Francisco, in the county of San Francisco and State of California, have invented new and useful Improvements in Contra-Piston Brakes for Motor Vehicles, of which the following is a specification.

This invention relates to an improved brake for automobiles and has for its principal object to provide means which may be relied upon independently of the wheel brakes for realizing a positive braking effect for the vehicle and thus assure an absolute control of the vehicle under the most severe conditions, such for instance as descending steep grades where failure of the wheel brake would prove fatal.

Another object of this invention is to so construct the braking device that a variation of the braking effect may be obtained by the driver in a convenient and practical manner, without danger of burning the brake bands the device having a wider range of positive brake adjustment than the ordinary wheel brakes.

A further object of this invention is to produce a device of the character described which is economical to manufacture, easy to operate, readily applicable to various types of motor vehicles without materially altering the construction of the same, and a device which is positive in operation and highly efficient in use.

Other objects and advantages will be apparent during the course of the following description.

In the accompanying drawings forming a part of this specification and in which like numerals are employed to designate like parts throughout the same, Fig. 1 is a side view of the power plant of an automobile showing my braking device as applied, Fig. 2 is a view in longitudinal section of the major parts of my device, Fig. 3 is a cross section on the line 3—3 of Figure 2, and Fig. 4 is a cross section on the line 4—4 of Figure 2.

In the accompanying drawings wherein for the purpose of illustration is shown a preferred embodiment of my invention, the numeral 1 represents the engine of an automobile which may have any number of conventional cylinders, but it is to be understood that my device is used in direct connection with only one of the cylinders. The numeral 2 designates the dash board of the vehicle and the numeral 3 the instrument board. The device is connected to either the top or side of one of the cylinders by the pipe connection 4, which is threaded to the nipple 5 of the cap 6. The interior of the cap is hollowed out to leave a chamber 6' in communication with the bore in the nipple. The forward interior is also hollowed with a valve seat 7 made to receive a poppet valve 8, the stem 9 of which extends horizontally through the sleeve 10, the latter being arranged in the center of the closed end 11 of the cap and surrounded by a series of small openings 12, which communicate with the hollow of the cap and the atmosphere. The valve stem extends beyond the end of the sleeve and has a nut 13 on its end with a spring 14 around the stem between the nut and sleeve and acting to normally hold the valve head on its seat so as to close the communication between the opening 12 and the connection 4 in the cylinder.

Threaded in the side of the cap 6 is a head 15 which has a threaded bore made to receive the plug 16.

This plug is provided with a bore 17, which is open at the end 18 of the plug, but closed at the end 19. The plug also includes a stem 20 which extends therethrough to the instrument board 3 and terminates with a hand wheel or the like 21 so that the driver may turn the plug 16 to adjust the radial opening 22 made in the side of the plug to regulate the port area of the opening 23 in the side of the head. This opening in turn connects with a flexible pipe 24, which extends beneath the car, which pipe serves to carry off any hissing noise occasioned during the operation of the device.

The operation of my device is as follows:

In descending a grade the clutch is left in, and the hand wheel 21 is then unscrewed so that the valve 8 will be unseated. Then upon the suction stroke of the piston in the cylinder to which the device is applied, the valve being unseated, a quantity of air will be sucked into the cylinder through the openings 12. Upon the compression stroke it will be discharged through the opening 22 in the plug and then into the piping 24. By regulating the position of the opening 22 relative to the opening 23 the port area of this escape for the air may be so adjusted as to obtain the desired braking effect. By choking off the escape the braking effect will be increased. When the device is to be held in an inoperative position the plug 16 is closed up until the end 18 abuts against the side of the valve which action cuts off the escape entirely and also holds the valve upon its seat.

From the foregoing description taken in connection with the accompanying drawing it will be apparent that this device when attached to one cylinder of the engine makes a contra-piston brake of said cylinder, the braking effect being readily accomplished at the will of the operator. When the braking effect is not desired the cylinder works in the usual way. For instance, in using this device more or less air is taken in with the first piston stroke and compression with the second stroke, and the driver has intake and compression under absolute control. Furthermore, this brake will function in a wide range so that the machine to which it is applied can be readily slowed down or brought to a complete stop.

It is to be understood that the form of my invention, herewith shown and described is to be taken as a preferred example of the same, and that various changes in the shape, size and arrangement of parts may be resorted to without departing from the spirit of the invention, or the scope of the subjoined claims.

Having thus described my invention, I claim:

1. In a device of the class described, a valve intake to the engine cylinder adapted to admit air into the cylinder upon the down stroke of the piston, and an adjustable outlet adapted to regulate the escape of air thus admitted, substantially as and for the purpose described.

2. In a device of the class described, a valve intake to the engine cylinder adapted to admit air into the cylinder upon a down stroke of the piston and an adjustable outlet adapted to regulate the escape of air thus admitted, said adjustable outlet including a screw plug and adapted to hold the valve of the intake upon its seat and to close the outlet when the device is inactive.

3. In a device of the class described, a valve intake to the engine cylinder adapted to admit air into the cylinder upon the down stroke of the piston and an adjustable outlet adapted to regulate the escape of air thus admitted, said adjustable outlet including a screw plug and adapted to hold the valve of the intake upon its seat and close the outlet when the device is inactive, said intake including a valve and a seat therefor, and the outlet including a screw plug positioned axially of the valve and having an interior bore with an opening adapted to register as an outlet opening in the side of the device, and means for regulating the relative adjustable positions of said opening.

4. In a device of the class described, a valved intake into the cylinder of an internal combustion engine adapted to admit air into the cylinder upon the suction stroke of the piston, and an adjustable outlet for the escape of air thus admitted upon the compression stroke of the piston, said outlet including a screw plug having a radial opening intermediate its ends adapted to register with an opening in a housing which confines the plug, and means for moving the plug to change the effective port area of said openings to control the escape of air therethrough.

5. In a device of the class described, a valved intake into the cylinder of an internal combustion engine adapted to admit air into the cylinder upon the suction stroke of the piston, and an adjustable outlet for the escape of air thus admitted upon the compression stroke of the piston, said outlet including a screw plug having a radial opening intermediate its ends adapted to register with an opening in a housing which confines the plug, and means for moving the plug to change the effective port area of said openings to control the escape of air therethrough, said plug being mounted behind the valve and axially thereof and adapted to be moved in contact with the valve head to hold the same inactive upon its seat to close the inlet as well as the outlet.

6. A device of the class described and as set forth in claim 5 and in which the valve and the plug for the outlet are housed within a hollow two part casting with the said parts having a threaded engagement one with the other to produce a combined housing for the valve and plug.

In testimony whereof I affix my signature.

ANTON HULSMANN.